Nov. 15, 1960   G. B. COBEL   2,960,397
SEPARATION OF CALCIUM METAL FROM CONTAMINANTS
Filed Sept. 3, 1958   2 Sheets-Sheet 1

INVENTOR.
George B. Cobel
BY
C.W. Carlin
ATTORNEY

Nov. 15, 1960  G. B. COBEL  2,960,397
SEPARATION OF CALCIUM METAL FROM CONTAMINANTS
Filed Sept. 3, 1958  2 Sheets-Sheet 2
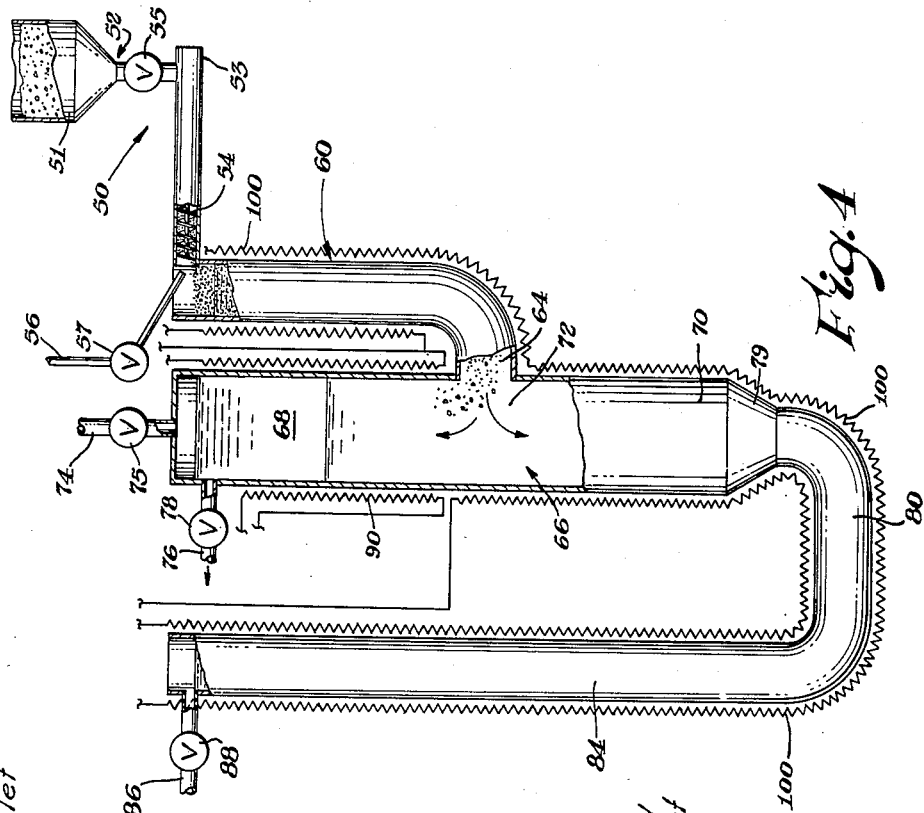
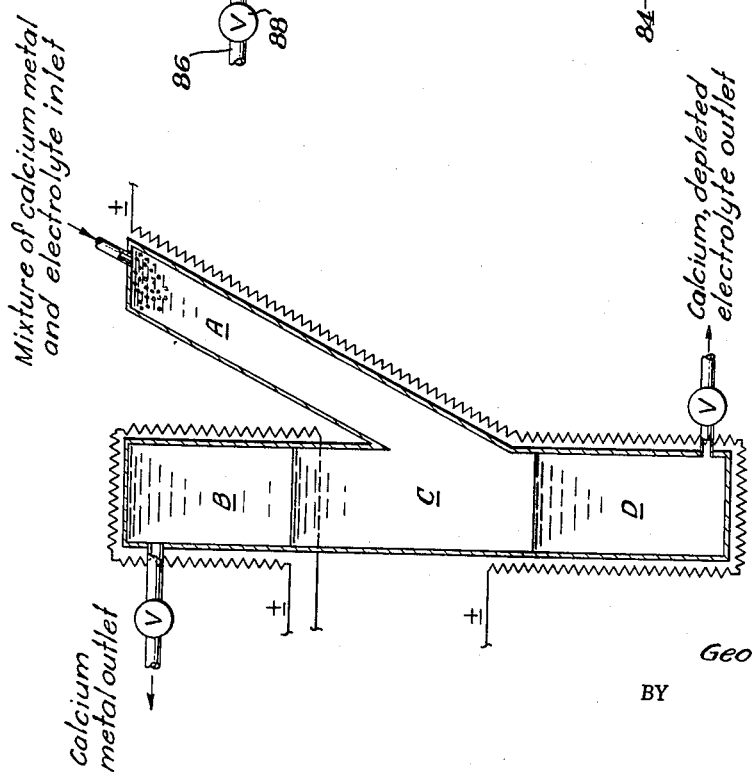
INVENTOR.
George B. Cobel
BY
C.W.Catlin
ATTORNEY United States Patent Office 2,960,397
Patented Nov. 15, 1960

2,960,397

SEPARATION OF CALCIUM METAL FROM CONTAMINANTS

George B. Cobel, Midland, Mich., assignor to The Dow Chemical Company, Midland, Mich., a corporation of Delaware Filed Sept. 3, 1958, Ser. No. 758,784

4 Claims. (Cl. 75—67)

The invention relates to the separation of calcium metal from entrapped, adhering or occluded contaminants having a lower melting point than calcium and particularly from the adhering and entrapped constituents of the bath employed in the electrolytic production of calcium metal.

The separation of calcium metal, hereinafter usually referred to as calcium for brevity, from the electrolytic bath from which it was produced has long presented a problem. It has presented a particularly difficult problem in the light of recent advancements in the electrolytic production of calcium. Calcium is reactive with water. Furthermore, some electrolytes employed in the production of calcium contain relatively water-insoluble constituents, such as calcium fluoride. Therefore, calcium cannot be separated from adhering electrolyte by water-washing. Separation of calcium from adhering and entrained electrolytic bath has been accomplished by sublimation of the bath constituents from the calcium under carefully controlled conditions. Such a process requires costly equipment, high operating temperatures, and is relatively slow. There has been no adequate method of separating adhering and entrained electrolyte from the calcium produced therefrom prior to the present invention invention. A particularly serious problem occurs when calcium metal is to be separated from a mixture of $CaCl_2$ and calcium metal in which the $CaCl_2$ is present in a relatively large amount. When such condition exists and a separation is attempted by the application of heat, the calcium appears to dissolve reactively in the chloride forming what is thought to be calcium monochloride according to the equation: $Ca+CaCl_2 \rightarrow 2CaCl$, as described broadly in Natur Wissenschaften 41, pp. 211–212 (1954), by Ehrlich and Gentsch. The extent to which the dissolution takes place is dependent largely on the temperature employed, the general principle being, the higher the temperature employed, the greater the extent of dissolution of the calcium metal. The metal thus dissolved is not recoverable by known practical methods and represents a substantial loss.

A definite need, therefore, exists for an effective method and means for separating calcium metal from contaminants, e.g., adhering electrolytic bath.

The present invention meets this long felt need. It provides an improved method and apparatus employing such method for the separation of calcium metal from such contaminants having a lower melting point than calcium metal and is especially directed toward removal of adhering and entrained electrolytic bath.

In copending application S.N. 752,350, filed July 31, 1958, there is described a new and improved electrolytic bath and method of producing calcium metal electrolytically. The preferred bath therein described contains by weight from 60–40 percent $BaCl_2$ and 40–60 percent $CaCl_2$ or it may consist of from 70–30 percent $BaCl_2$ and 30–70 percent $CaCl_2$ and up to 15 percent of KCl and/or up to 15 percent $CaF_2$. The method described therein employs the electrolyte at a temperature above the melting point of the electrolyte and below the melting point of calcium metal in a cell equipped with a submerged cathode upon which the calcium metal deposits as a solid and is removed therefrom. Calcium metal prepared according to S.N. 752,350 is particularly suitable for the separation of the adhering electrolyte therefrom by the pratice of the present invention.

The present invention consists essentially of a separation cell and method of separating calcium metal intermixed with a contaminant, especially electrolytic bath, wherein the bath containing the calcium metal is introduced into a separation zone; air and other residual gases are expelled therefrom; heat is applied to the upper part of the separation zone in sufficient amount to raise the temperature of the contents of said upper part of the zone to between the melting point and boiling point of calcium metal and relatively less heat is applied to the lower part of the zone in sufficient amount to raise the temperature of the contents of said lower part of the zone to above the melting point of the electrolytic bath but below the melting point of the calcium metal. A temperature gradient is thus provided in the separation zone ranging from the higher temperature at the top to the lower temperature at the bottom thereof. The calcium metal is thereby caused to separate from the adhering electrolytic bath and rise to the top thereof where it forms into a molten layer in the separation zone from which it may be removed. The calcium-depleted electrolytic bath may be conveniently removed from the lower section of the zone.

The apparatus of the invention consists essentially of a central separatory chamber, a heating means therefor adjustable for heating the upper and lower portions of the heating chamber to the temperatures required by the process, means for supplying contaminated calcium metal, and separate means for removing the separated calcium metal and the contaminant in either the molten or solid state.

The separation of calcium metal from electrolytic bath containing $CaCl_2$ by employing the method and apparatus of the invention largely obviates the aforementioned loss due to the reactive dissolution of calcium metal in the molten $CaCl_2$ by the formation of calcium monochloride, because any calcium monochloride formed in the upper or high-temperature zone of the invention diffuses to the lower and cooler zone reforming into calcium metal and $CaCl_2$.

The practice of the invention will be made clear in the ensuing description when read in conjunction with the annexed drawing wherein:

Figure 3 is a schematic representation of a tube arrangement to illustrate the principle applied in a continuous process according to the invention.

Figure 4 is a sectional elevation of an apparatus suitable for a continuous process in accordance with the invention.

Figure 2:
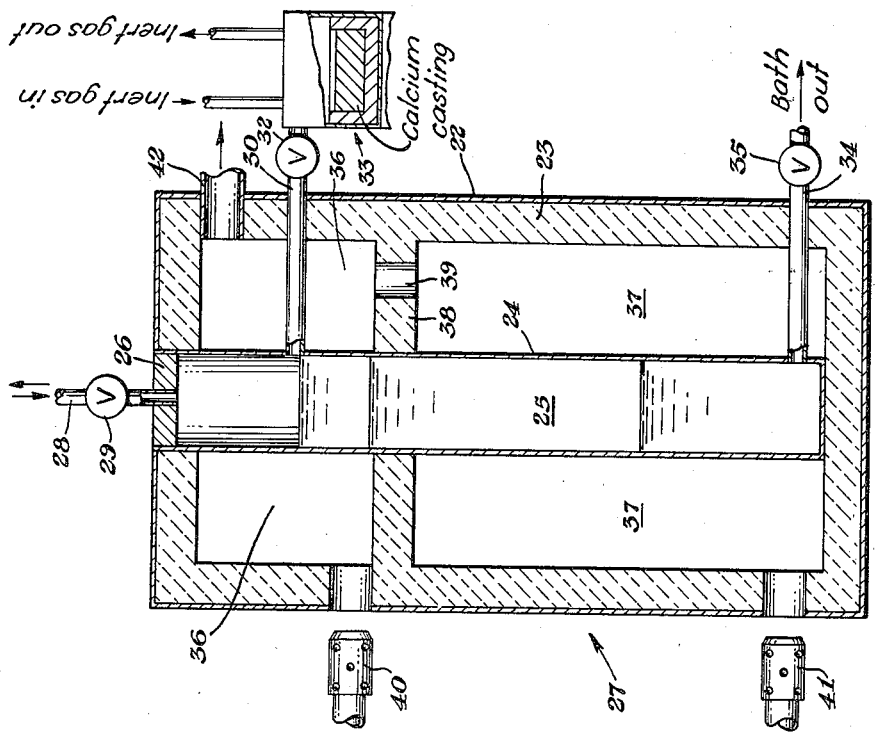
Figure 2 is a sectional elevation of an apparatus of the invention which is suitable for a semi-continuous process according to the invention.
Figure 1:
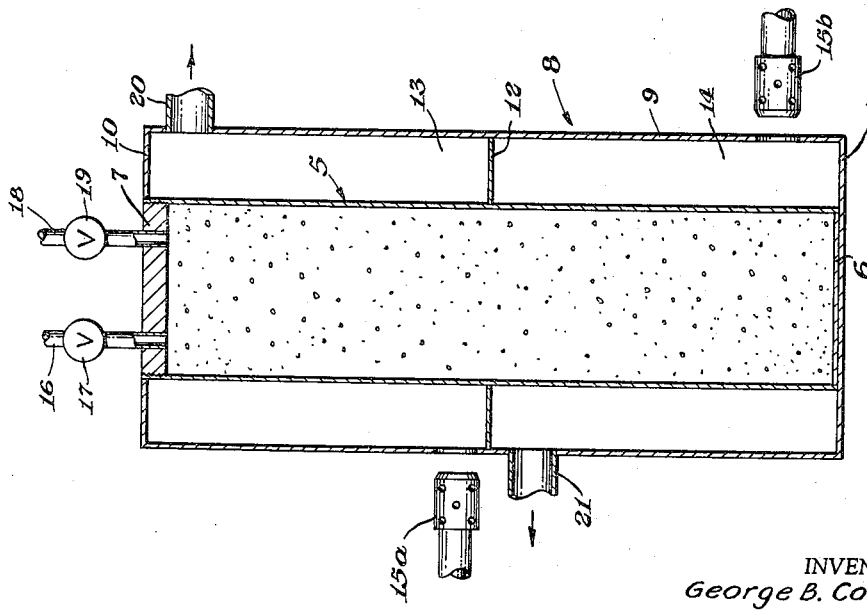
Figure 1 is a sectional elevation of a tube and heating arrangement for a batch process according to the invention.

Referring to the drawing in more detail:

In Figure 1, there is shown a separation chamber in the form of vertically elongated steel tube 5, having bottom 6 and screw cap 7, removably and substantially centrally positioned in heating chamber 8 consisting of steel cylindrical wall 9, top 10 having a central opening therein for tube 5, and bottom 11. Tube 5 is usually cylindrical having a diameter between about $\frac{1}{10}$ and $\frac{1}{3}$ of its height. Horizontal partition 12 together with tube 5 forms upper annular section 13 and lower annular section 14 in chamber 8. Heat, sufficient to provide a temperature above the melting point of calcium metal, is supplied to upper section 13 by gas burner 15a, and heat, sufficient to provide a temperature above the melting point of the adhering electrolytic bath below the melting point of calcium metal, is supplied to lower section 14 by burner 15b. Flames from 15a and 15b extend into chambers 13 and 14 through openings provided therefor in wall 9. Two openings are provided in screw cap 7 into one of which is securely inserted inert gas input line 16 having valve 17 therein and into the other one of which is securely inserted venting nipple 18 having valve 19 therein to provide a means for adjusting the flow of gas escaping from tube 5. Exhaust ducts 20 and 21 provide means for escape of combustion gases from heating sections 13 and 14, respectively. Separation chamber 5 is shown charged with a fragmented electrolytic bath containing calcium metal preparatory to being separated therefrom according to the invention.

Figure 2 illustrates a suitable apparatus for semi-continuous operation in accordance with the invention. It shows cylindrical steel shell 22 with refractory lining 23. Substantially centrally positioned therein is steel cylindrical vessel 24 which defines inner separation chamber 25 and together with 23, defines the annular heating chamber to which reference is made generally by numeral 27. Inner chamber 25 has a removable cover 26 thereon which provides a means for adding the mixture of electrolytic bath or other contaminant intermixed with metallic calcium to be separated therefrom. Gas line 28, having valve 29 therein, for exhausting contaminating gases from and supplying an inert gas to chamber 25, passes through an opening provided therefor in cover 26. Horizontal outlet line 30, having valve 32 therein and leading from the upper part of chamber 25, provides an outlet for molten calcium metal; horizontal outlet line 34 having valve 35 therein at the lower part of chamber 25 provides a drain means for molten electrolytic bath. Annular chamber 27 is divided into upper section 36 and a lower section 37 by horizontal partition 38. Partition 38 has opening 39 therein for the passage of combustion gases. Openings are provided in shell 22 and liner 23 to admit the flames from high-temperature gas burner 40 to provide heat for upper section 36 and from lower temperature burner 41 to provide heat for lower section 37 of annular chamber 27. Exhaust duct 42 provides a means for the escape of combustion gases from both upper section 36 and lower section 37.

Figure 3 depicts the principle underlying the process of continuous operation according to the invention. Although it may be interpreted largely from an examination of the figure as illustrated, it will be briefly described as follows: Section A represents a receiving zone for raw feed consisting of calcium metal and a lower melting point contaminant, e.g., adhering electrolytic bath to be separated, which has a temperature above the melting point of the electrolytic bath but below the melting point of calcium, say a temperature of about 600° C. Section B represents the upper portion of the separatory zone for the accumulation of a layer of calcium metal at a temperature above the melting point and substantially below the boiling point of calcium metal, say a temperature of about 850° C. Section C is an intermediate-temperature zone which, during operation, is occupied with a mixture having a relatively high calcium metal content in the upper portion thereof which approaches the temperature of the molten calcium layer and having a relatively low calcium metal content in the lower portion thereof which approaches the temperature of fresh feed, there being a gradually decreasing temperature gradient downwardly therethrough. Section D contains calcium-depleted electrolytic bath or contaminant and has a temperature approximately the same as that of Section A.

Figure 4 shows an apparatus suitable for continuous operation in accordance with the invention. It shows a feed assembly, referred to generally by numeral 50, which consists of reservoir 51, funnel and feed tube arrangement 52, barrel 53, feed screw 54 rotatable in barrel 53 by a shaft and power source (not shown), and feed control valve 55. Inert gas line 56 having valve 57 therein leads to the outlet of barrel 53. Barrel 53 opens into receiving chamber 60. At the bottom of receiving chamber 60 is connecting chamber 64 which leads into the separation chamber referred to generally by numeral 66. Separation chamber 66 consists of upper section 68, lower section 70 and, intermediate therebetween, section 72. Inert gas line 74, having valve 75 therein, leads into upper section 68. Outlet 76 for molten calcium metal leads from the upper part of section 68. It is controlled by valve 78. Section 70 has tapered outlet 79 which leads into connecting chamber 80 which in turn leads into exit chamber 84. At the top of chamber 84 is electrolytic bath outlet 86 having valve 88 therein. High temperature heating element 90 is shown positioned about upper section 68 of chamber 66. Lower temperature heating element 100 is shown positioned about receiving chamber 60, a part of intermediate section 72, lower section 70 of chamber 66, and about connecting chambers 64, 80 and exit chamber 84.

The apparatus is conveniently made of steel. It may, however, be constructed of brick, concrete, or ceramic material which is sufficiently resistant to the effects of heat and the reactivity of the molten electrolyte and molten calcium metal.

In practicing the invention as a batchwise process, employing an apparatus similar to that shown in Figure 1, a mixture of calcium metal and contaminant having a lower melting point than calcium metal, e.g., electrolytic bath, such as is produced by copending application S. N. 752,350, is broken into small particles and, after removing cap 7, is loaded into tube 5, which may, for convenience, have been removed from the heating chamber of the apparatus. Cap 7 is screwed tightly into tube 5 and the tube thus loaded, if previously removed, is placed in position, as shown, in chamber 8. Valve 17 in inert gas line 16 is opened and inert gas, e.g., argon, is introduced into tube 5. Valve 19 in vent 18 is opened as desired and residual gases, particularly air, are purged from tube 5 through vent 18. The valves in gas lines 16 and 18 may then be closed and gas burners 15a and 15b both lighted. The flame temperature of upper gas burner 15a is adjusted to produce sufficient heat in upper section 13 of chamber 8 to raise the temperature of the contents of the upper part of tube 5 above the melting point of calcium metal, e.g., 800–850° C. Lower temperature gas burner 15b is adjusted to produce sufficient heat in lower section 14 of chamber 8 to raise the temperature of the contents of the lower part of tube 5 above the melting point of the electrolytic bath but below the melting point of calcium metal, e.g., 550°–680° C. Heating is continued until the calcium metal in the electrolytic bath feed is substantially all converted into a layer of molten calcium metal in the upper part of tube 5. The gas burners are then shut off, tube 5 removed and the calcium metal layer recovered. The recovery is best attained by allowing tube 5 to cool before removal and then, after removal, cutting the tube into two at the bottom of the calcium layer. To avoid the need for cutting tube 5, it may be constructed of suitable length sections jointed by couplings for convenient separation.

The apparatus of Figure 1 is suitable only for small scale operations. The apparatus of Figure 2 is more suitable for production wherein the molten calcium metal may be drawn off through line 30 as it is produced and calcium-depleted electrolytic bath may be drawn off through line 34, it only being necessary to suspend operations sufficiently long to add additional raw feed to chamber 25, purge with inert gas through line 28, and bring sections 36 and 37 up to the desired operating temperatures by means of burners 40 and 41, respectively. Electrical heating may be employed if desired in place of the gas heating means shown. It is not recommended in operating the apparatus of Figure 2 to separate substantially all the calcium metal from each charge before recharging. It is recommended that a new charge be made while there yet remains a substantial portion of the original charge which is in a stage of partial separation. The portion of the original charge not sufficiently separated will be located above the more depleted portion so that the latter may be drawn off.

When valve 32 in molten calcium outlet 30 of Figure 2 is opened and the molten calcium is drawn out, it must be protected from contamination until it approaches room temperature. It is recommended that outlet 30 lead into a casting mold in an inert gas atmosphere, referred to generally by numeral 33.

In practicing the invention by employing an apparatus of the type shown in Figure 4, which applies the basic principle of continuous operation schematically represented in Figure 3, particulate feed is placed in reservoir 51. Valve 55 is opened, screw 54 put into operation and inert gas admitted through lines 56 and 74 which sweeps air from the chambers of the apparatus, some of the inert gas passing outwardly along barrel 53 and upwardly through reservoir 51 to remove air from the particulate feed. Heating elements 100 and 90 are started heating and the temperature of each adjusted similarly as explained above. Molten calcium metal is thereby caused to separate from the mixed feed and to rise to the upper part of section 68 from whence it is continuously drawn off through line 76. Depleted electrolyte is similarly drawn off through line 86. The molten calcium metal from line 76 is conveniently flowed into a conventional mold assembly, protected by an inert gas (not shown), where it can be cast into suitable shapes and sizes.

The following example illustrates the practice of the invention employing an apparatus similar to that shown in Figure 1.

*Example*

170 grams of an electrolytic cell deposit produced by the practice of the invention described in S.N. 752,350, consisting of about 10 percent calcium metal and about 90 percent cell bath were placed in tubular separation chamber 5 which was then positioned in heating chamber 8 as shown, thereby forming upper annular section 13 and lower annular section 14. The cell bath employed in the preparation of the calcium metal consisted by weight originally of 40 parts $BaCl_2$, 40 parts $BaCl_2$, 10 parts KCl and 10 parts $CaF_2$. Separation chamber 5 consists of a ¾ inch diameter circular pipe, 20 inches high. The chamber was purged of residual gases by introducing argon gas through line 16. The upper portion of reaction chamber 5 was heated by burner 15a to a temperature of about 850° C. and the lower portion of the chamber was heated by burner 15b to a temperature of about 650° C. for four hours. After the four hour heating period, chamber 5 was allowed to cool and then removed by sliding it upwardly out of chamber 8. It was then cut in two at a point about 5 inches from the top. The lower portion of the chamber thus severed contained largely electrolyte. The upper portion of the chamber thus removed contained solidified calcium metal which was removed therefrom by placing the tube portion in a conventional heater and melting the calcium. It analyzed 96.9 percent purity. It contained small percentages of barium and chlorides from occluded electrolyte. Such purity value compares favorably with commercially available calcium. If desired, such small percentages of salts may be separated by known volatilization procedure.

The calcium metal thus produced, without further treatment, however, is highly valuable for a number of uses, examples of which are the reduction of titanium and zirconium oxides; the making of a number of alloys particularly those for the bearing metals, for battery plates and grids, and for alloys employing Al, Be, Cu, Pb and Mg, generally; for deoxidizing alloys such as Cr—Ni and steel (especially Ni—Cr—Fe and Fe—Ni); in the manufacture of Sn-bronze and Ni-bronze; for desulfurizing petroleum and metals; as a getter alloy in radio tubes; in the preparation of organic reagents; and as a separator of bismuth from lead and of nitrogen from argon.

Having described the invention, what is claimed and desired to be protected by Letters Patent is:

1. An apparatus for the continuous separation of a particulated mixture of calcium metal and occluded electrolytic bath consisting of a feed means for the particulated mixture, a feed chamber and a heating means therefor capable of heating to a temperature above the melting point of the electrolytic bath and below the temperature of calcium metal, an inert gas supply means in communication with said receiving chamber and feed means, and a vertically elongated separatory chamber having an upper section and a heating means therefor capable of heating said upper section to a temperature above the melting point of calcium metal and a lower section and a heating means therefor capable of heating said lower section to a temperature above the melting point of the electrolyte and below the melting point of calcium metal, a connecting passageway leading from said receiving chamber into said separatory chamber intermediate said upper and lower sections thereof, an outlet for molten calcium metal leading from said upper section into an inert gas-protected member in communication therewith, and an outlet for molten electrolyte leading from said lower section, and means for maintaining the fluid level in the upper section of said separatory chamber at a point not lower than said molten calcium outlet.

2. The apparatus of claim 1, wherein said inert gas protected member is a calcium metal casting means positioned to receive molten calcium metal from the outlet of the upper section of said separatory chamber.

3. The method of separating calcium metal from a mixture of calcium metal and occluded and adhering solid contaminants having a lower melting point than calcium metal consisting of subjecting a column of the mixture to a temperature gradient decreasing from the top of the column downwardly, the temperature at the upper part of said column being between the melting point and boiling point of calcium metal and the temperature of the lower portion of said column being between the melting point of the contaminants and the melting point of calcium metal whereby the calcium metal rises forming a molten layer thereof in the upper part of the column, and thereafter removing the calcium layer thus formed.

4. The method of claim 3, wherein the temperature at the upper part of said column is between 810 and 850° C. and the temperature of the lower part of said column is between 550 and 680° C.

References Cited in the file of this patent

UNITED STATES PATENTS

| | | |
|---|---|---|
| 2,054,316 | Gilbert | Sept. 15, 1936 |
| 2,572,489 | Jordan | Oct. 23, 1951 |
| 2,739,045 | Pfann | Mar. 20, 1956 |
| 2,739,046 | Pfann | Mar. 20, 1956 |
| 2,813,017 | Mathieu | Nov. 12, 1957 |

FOREIGN PATENTS

| | | |
|---|---|---|
| 594,152 | Great Britain | Nov. 4, 1947 |